United States Patent
Kuijpers

(10) Patent No.: US 12,454,665 B2
(45) Date of Patent: Oct. 28, 2025

(54) PRODUCTION OF AN ALCOHOL-FREE BEVERAGE

(71) Applicant: Heineken Supply Chain B.V., Amsterdam (NL)

(72) Inventor: Niels Gerard Adriaan Kuijpers, Haarlem (NL)

(73) Assignee: Heineken Supply Chain B.V., Amsterdam (NL)

( * ) Notice: Subject to any disclaimer, the term of this patent is extended or adjusted under 35 U.S.C. 154(b) by 0 days.

(21) Appl. No.: 17/635,160

(22) PCT Filed: Aug. 14, 2020

(86) PCT No.: PCT/NL2020/050514
§ 371 (c)(1),
(2) Date: Feb. 14, 2022

(87) PCT Pub. No.: WO2021/034191
PCT Pub. Date: Feb. 25, 2021

(65) Prior Publication Data
US 2023/0220317 A1    Jul. 13, 2023

(30) Foreign Application Priority Data
Aug. 16, 2019    (NL) ................................ 2023654

(51) Int. Cl.
*C12C 12/04* (2006.01)
*C12C 11/00* (2006.01)
*C12C 12/00* (2006.01)

(52) U.S. Cl.
CPC ............ *C12C 12/04* (2013.01); *C12C 11/003* (2013.01); *C12C 12/006* (2013.01)

(58) Field of Classification Search
CPC ..................................................... C12C 12/04
See application file for complete search history.

(56) References Cited

U.S. PATENT DOCUMENTS

| | | |
|---|---|---|
| 4,317,217 A | 2/1982 | Davidson et al. |
| 4,661,355 A | 4/1987 | Schur |
| 4,746,518 A | 5/1988 | Schur |
| 4,814,188 A | 3/1989 | Dziondziak |

(Continued)

FOREIGN PATENT DOCUMENTS

| | | |
|---|---|---|
| DE | 2145298 A | 3/1973 |
| DE | 2323094 A1 | 11/1974 |

(Continued)

OTHER PUBLICATIONS

Sohrabvandi et al., "Alcohol-free Beer: Methods of Production, Sensorial Defects, and Healthful Effects", Food Reviews International, 26, (2010), pp. 335-352. (Year: 2010).*

(Continued)

*Primary Examiner* — Elizabeth Gwartney
(74) *Attorney, Agent, or Firm* — Banner & Witcoff, Ltd.

(57) ABSTRACT

The invention relates to methods of producing an alcohol-reduced fermented beverage, and to a resulting alcohol-reduced fermented beverage. The invention further relates to an use of a fermentative yeast that is not capable of completely converting glucose, maltose and/or maltotriose into ethanol, for the production of an alcohol-reduced fermented beverage.

Figure 1:
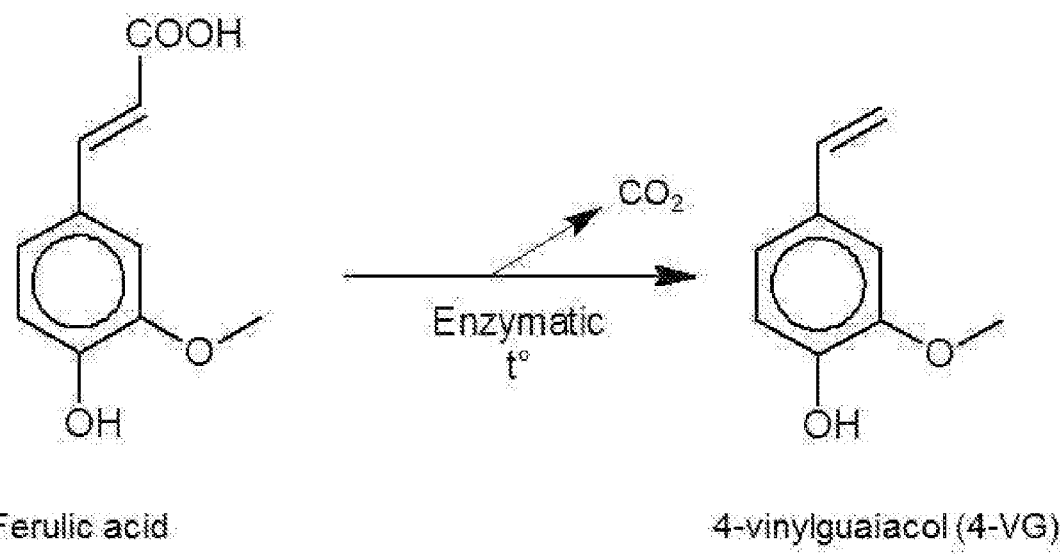

17 Claims, 6 Drawing Sheets
Specification includes a Sequence Listing.

(56) References Cited

U.S. PATENT DOCUMENTS

| | | | | |
|---|---|---|---|---|
| 4,970,082 | A | * | 11/1990 | Huige ............... C12H 3/00 426/29 |
| 2012/0207909 | A1 | | 8/2012 | Itakura et al. |
| 2018/0208882 | A1 | * | 7/2018 | Ishihara ............ C12C 5/04 |
| 2019/0194723 | A1 | | 6/2019 | Wendt et al. |

FOREIGN PATENT DOCUMENTS

| | | | |
|---|---|---|---|
| DE | 2339206 | A1 | 3/1975 |
| DE | 2413236 | A1 | 9/1975 |
| EP | 332738 | A1 | 9/1989 |
| EP | 2385100 | A1 | 11/2011 |
| GB | 2270525 | A | 3/1994 |
| JP | S58-121779 | A | 7/1983 |
| JP | S62-272965 | A | 11/1987 |
| JP | 2004536604 | A | 12/2004 |
| JP | 2017209028 | A | 11/2017 |
| JP | 2018531601 | A | 11/2018 |
| JP | 2019524083 | A | 9/2019 |
| WO | 2003010277 | A1 | 2/2003 |
| WO | 2004041992 | A1 | 5/2004 |
| WO | 2011158395 | A1 | 12/2011 |
| WO | 2013030398 | A1 | 3/2013 |
| WO | 2014135673 | A2 | 9/2014 |
| WO | 2016187021 | A1 | 11/2016 |
| WO | 2017077084 | A1 | 5/2017 |

OTHER PUBLICATIONS

Capece et al., "Conventional and Non-Conventional Yeasts in Beer Production", Fermentation, 4, 38, (2018), pp. 1-11. (Year: 2018).*

International Search Report for corresponding International Application No. PCT/NL2020/050514 dated Oct. 28, 2020, 4 pages.

Dietvorst et al., "Maltotriose utilization in lager yeast strains: MTT1 encodes a maltotriose transporter," Yeast, 2005, 14 pages.

Hittinger, "Saccharomyces diversity and evolution: a budding model genus," Trends in Genetics, 2013, 9 pages.

Naseeb et al., "Saccharomyces jurei sp. nov., isolation and genetic identification of a novel yeast species from Quercus robur," International Journal of Systematic and Evolutionary Microbiology, Jun. 2017, 8 pages.

Libkind et al., "Microbe domestication and the identification of the wild genetic stock of lager-brewing yeast," Proc Natl Acad Sci, 2011, 6 pages.

Peris et al., "Population structure and reticulate evolution of Saccharomyces eubayanus and its lager-brewing hybrids," Molecular Ecology, 2014, 15 pages.

Bing et al., "Evidence for a Far East Asian origin of lager beer yeast," Current Biology, vol. 24, Issue 10, May 2014, 2 pages.

Gayevskiy et al., "Saccharomyces eubayanus and Saccharomyces arboricola reside in North Island native New Zealand forests," Environmental Microbiology, 2016, 11 pages.

Hebly et al., "S. cerevisiae x S. eubayanus interspecific hybrid, the best of both worlds and beyond," FEMS Yeast Research, 2015, 14 pages.

Krogerus et al., "New lager yeast strains generated by interspecific hybridization," J Ind Microbiol Biotechnol, 2015, 10 pages.

Gibson et al., "Comparative physiology and fermentation performance of Saaz and Frohberg lager yeast strains and the parental species Saccharomyces eubayanus," Yeast, vol. 30, Jul. 2013, 27 pages.

Gibson et al., "New yeasts—new brews: modern approaches to brewing yeast design and development," FEMS Yeast Research, 2017, 13 pages.

Wieczorke et al., "Concurrent knock-out of at least 20 transporter genes is required to block uptake of hexoses in Saccharomyces cerevisiae," FEBS Letters, 1999, 6 pages.

Wijsman et al., "A toolkit for rapid CRISPR-SpCas9 assisted construction of hexose-transport-deficient Saccharomyces cerevisiae strains," FEMS Yeast Research, 2019, 12 pages.

Roy et al., "The glucose metabolite methylglyoxal inhibits expression of the glucose transporter genes by inactivating the cell surface glucose sensors Rgt2 and Snf3 in yeast," Molecular Biology of the Cell, 2016, 10 pages.

Mukai et al., "PAD1 and FDC1 are essential for the decarboxylation of phenylacrylic acids in Saccharomyces cerevisiae," Journal of Bioscience and Bioengineering, vol. 103, No. 6, 2010, 6 pages.

Gietz et al., "High-efficiency yeast transformation using the LiAc/SS carrier DNA/PEG method," Nature Protocols, vol. 2, No. 1, 2007, 5 pages.

Solis-Escalante et al., "amdSYM, a new dominant recyclable marker cassette for Saccharomyces cerevisiae," FEMS Yeast Research, vol. 13, Issue 1, Feb. 2013, 14 pages.

Looke et al., "Extraction of genomic DNA from yeasts for PCR-based applications," BioTechniques, May 2011, 3 pages.

Verduyn et al., "Effect of Benzoic Acid on Metabolic Fluxes in Yeasts: A Continuous-Culture Study on the Regulation of Respiration and Alcoholic Fermentation," Yeast, vol. 8, 1992, 17 pages.

Vos et al., "Growth-rate dependency of de novo resveratrol production in chemostat cultures of an engineered Saccharomyces cerevisiae strain," Microb Cell Fact, 2015, 15 pages.

De Kok et al., "Energy coupling in Saccharomyces cerevisiae: selected opportunities for metabolic engineering," FEMS Yeast Research, vol. 12, Issue 4, Jun. 2012, 11 pages.

Baker et al., "The Genome Sequence of Saccharomyces eubayanus and the Domestication of Lager-Brewing Yeasts," Molecular Biology and Evolution, vol. 32, Issue 11, Nov. 2015, 14 pages.

Li et al., "Fast and accurate short read alignment with Burrows—Wheeler transform," Bioinformatics, vol. 25, Issue 14, Jul. 2009, 7 pages.

Li et al., "The Sequence Alignment/Map format and SAMtools," Bioinformatics, vol. 25, Issue 16, Aug. 2009, 2 pages.

Li et al., "Fast and accurate long-read alignment with Burrows—Wheeler transform," Bioinformatics, vol. 26, Issue 5, Mar. 2010, 7 pages.

Walker et al., "Pilon: An Integrated Tool for Comprehensive MicrobialVariant Detection and Genome Assembly Improvement," PLOS ONE, https://journals.plos.org/plosone/article?id=10.1371/journal.pone.0112963, 2014, 16 pages.

Pengelly et al., "Rapid identification of Saccharomyces eubayanus and its hybrids," FEMS Yeast Research, vol. 13, Issue 2, Mar. 2013, 6 pages.

Haase et al., "Improved flow cytometric analysis of the budding yeast cell cycle," Cell Cycle, vol. 1, Issue 2, Mar. 2002, 6 pages.

Van Den Broek et al., "Chromosomal Copy Number Variation in Saccharomyces pastorianus Is Evidence for Extensive Genome Dynamics in Industrial Lager Brewing Strains," Applied and Environmental Microbiology, vol. 81, No. 18, Sep. 2015, 15 pages.

Entian et al., "25 Yeast Genetic Strain and Plasmid Collections," Methods in Microbiology, Yeast Gene Analysis, Second Edition, vol. 36, 2007, 38 pages.

Jiang, et al. "A novel approach for the production of a non-alcohol beer (≤0.5% abv) by a combination of limited fermentation and vacuum distillation." Journal of Institute of Brewing & Distilling. vol. 123. 2017. pp. 533-536.

Fermentis. Technical Data Sheet. Apr. 2019. 2 pages.

Pires et al. Maintaining yeast viability in continuous primary beer fermentation. J. Inst. Brew 2014, 120: 52-59.

De Francesco et al. "Screening of new strains of Saccharomycodes ludwigii and Zygosaccharomyces rouxii to produce low-alcohol beer" J. Inst. Brew. 2015; 121: 113-121.

Montanari et al., "6 Production of Alcohol—Free Beer", Beer in Health and Disease Prevention, Academic Press,Sep. 2008 / 15, pp. 61-75,ISBN: 978-0-12373891-2.

* cited by examiner

PRODUCTION OF AN ALCOHOL-FREE BEVERAGE

Field: The invention relates to methods for the production of an alcohol-reduced, including alcohol-free, beer product, and to the resulting beers. The invention especially relates to use of specific yeast strains for the production of such alcohol-reduced beer products.

1 BACKGROUND OF THE INVENTION

Fermentation effects conversion of fermentable sugars in ethanol, and also results in formation of various new flavor compounds, among which esters. At the same time, fermentation of beer removes most aldehydes, thereby preventing a worty flavor of the resulting beer. After fermentation, the beer may be filtered and/or stored, in order to optimize appearance and taste.

Health concerns and increased awareness of traffic safety associated with the alcohol content of beer have spiked interest in beer having low or even zero alcohol content. At present, there are two main techniques for the preparation of beer having low or zero alcohol content: de-alcoholisation of regular beer, and preparation of beer by restricted alcohol fermentation.

De-alcoholisation of beer is performed on regularly brewed beer, and is designed to remove ethanol, but as little as possible flavor components. De-alcoholisation may be achieved by for instance rectification, reverse osmosis or dialysis of regular beer. However, it is challenging to prevent flavor deprivation upon de-alcoholisation of beer. Consequently, a drawback of de-alcoholised beer is a flat flavor, which must be corrected by artificial addition of flavor and aroma compounds in order to obtain an acceptable beer. However, as taste and odor is complex due to large variety of compounds which together are responsible for imparting taste, de-alcoholised and subsequently artificially flavored beer is generally considered less agreeable in taste than the taste of regular beer.

Low- or zero alcohol beer can also be prepared by restricted alcohol fermentation. Restricted alcohol fermentation is a process whereby wort is fermented under conditions that there is no little or no ethanol formation. One important process is cold contact fermentation. When wort is fermented at low temperature, yeast does barely produce alcohol, although it does produce some flavor components such as esters, even though quantities per ester may differ from the quantities obtained from regular fermentation. At low temperature, the activity of yeast in degrading aldehydes responsible for the worty flavor is decreased. Consequently, low or zero alcohol beer produced using a cold contact process (or another restricted fermentation process) has the drawback of a relatively high aldehyde content, which imparts worty flavor to the low- or zero alcohol beer. In addition, such beers are generally relatively sweet, due to the presence of remaining fermentable sugars.

In general, the taste of beer, including an alcohol-free beer, is the result of a delicate balance between the quantity and type of various sugars, the quantity and type of various flavor compounds such as esters, and the quantity and type of various worty aldehyde flavors. A small base level of aldehydes does however contribute to beer taste, as has been described in US 2012/0207909. In addition, the quantity and type of among others salts and amino compounds, such as peptides and amino acids, may also affect the taste.

Existing low- or zero alcohol beers generally suffer from a lack of drinkability. Most people become saturated with the taste after only one or two glasses, which contrasts with the drinking of regular alcohol containing beer. The saturation with taste is generally caused by an overpowering flavor, caused by overintense worty flavors due to high aldehyde levels, and high concentrations of unfermented malt sugars. In addition, existing beers often are unbalanced. The present invention provides a method to overcome these drawbacks.

2 SUMMARY OF THE INVENTION

The present invention provides a method of producing an alcohol-reduced fermented beer, preferably an alcohol-free beer, comprising the steps of adding a fermentative yeast into wort for at least partially fermenting said wort, thereby retaining at least part of the fermentable sugars such as sucrose, fructose, glucose, maltose and/or maltotriose that is present in the wort, removing the yeast from the wort, and reducing alcohol content of the thus fermented beer, thereby producing an alcohol-reduced fermented beer, such as an alcohol-free beer.

It was found that the drinkability of thus produced alcohol-free beer was considerably improved if the sweet/sour ratio in the resulting product was increased, without the addition of e.g. sweeteners such as unfermented wort or glucose to the resulting product.

In one aspect, retaining at least part of the sucrose, fructose, glucose, maltose and/or maltotriose that is present in the wort, preferably in the starting wort, is accomplished by prematurely halting fermentation and removing the yeast from the wort.

A method of producing an alcohol-reduced fermented beer, including an alcohol-free beer, according to the invention may comprise the steps of adding a fermentative yeast into wort for at least partially fermenting said wort, whereby said fermentative yeast is not capable of converting hexoses such as glucose and/or fructose, disaccharides such as sucrose and/or maltose, and/or trisaccharides such as maltotriose into ethanol, or of completely converting hexoses, preferably glucose and/or fructose, disaccharides such as sucrose and/or maltose, and/or trisaccharides such as maltotriose into ethanol.

Said fermentative yeast preferably is not capable of converting at least trisaccharides such as maltotriose, preferably maltotriose and hexoses including glucose and fructose, into ethanol, or not capable of completely converting at least trisaccharides such as maltotriose, preferably maltotriose and hexoses including glucose and fructose, into ethanol. It has been reported that residual maltotriose, due to incomplete fermentation, in beer causes both quality and economic problems (Dietvorst et al., 2005. Yeast 22: 775-788). However, it was now surprisingly found that an alcohol-reduced beer product, preferably an alcohol-free beer product, from which the alcohol content has been reduced during and/or after fermentation and in which maltotriose from the input wort is present, has more 'body' compared to when a regular brewing yeast would have been used in the same process and all or part of the input maltotriose would have been fermented into ethanol. The resulting alcohol-reduced beer product, preferably an alcohol-free beer product, better matches the organoleptic characteristics of a conventional, high alcoholic beer.

Said fermentative yeast more preferably is not capable of completely converting hexoses, such as at least glucose, into ethanol, either as such or in addition to not being able to convert maltotriose into ethanol. The thus resulting alcohol-reduced beer product, preferably alcohol-free beer product, better matches the organoleptic characteristics of a conventional, high alcoholic beer.

Said fermentative yeast preferably is a yeast of the *Saccharomyces* sensu stricto complex, more preferably *Saccharomyces cerevisiae* and/or *S. eubayanus* yeast, and/or a hybrid thereof such as *S. pastorianus* (also termed *S. carlsbergensis*).

Said fermentative yeast preferably has a reduced decarboxylation activity of phenolic acids, preferably is not producing 4-vinyl guaiacol. For this, said fermentative yeast preferably comprises a mutation resulting in inactivation of at least one of the genes PAD1 and FDC1, and/or inactivation of a gene encoding a protein involved in uptake of a phenolic acid, preferably ferulic acid, or involved in export of a decarboxylated phenolic compound, preferably 4-vinyl guaiacol.

Said fermentation preferably is performed at a temperature of 6-25° C., preferably at 8-15° C.

The alcohol content of the fermented beer product is preferably reduced by rectification.

Said alcohol-reduced fermented beer product preferably is an alcohol-free beer, more preferably an alcohol-free lager beer, wild lager, pilsner, pale ale or saison.

The invention further provides an alcohol-reduced fermented beer product that is produced by any one of the methods of the invention. Said alcohol-reduced fermented beer product preferably is an alcohol-free beer, more preferably an alcohol reduced or alcohol-free lager beer, wild lager, pilsner, pale ale or saison.

The invention further provides an alcohol-reduced fermented beer product, preferably an alcohol-free beer, more preferably an alcohol-free lager beer, comprising at least one of the fermentable sugars sucrose, fructose, glucose, maltose and/or maltotriose that were present in the starting wort before fermentation. Said alcohol-reduced fermented beer product preferably comprises substantially all hexoses such as fructose and glucose, all trisaccharides such as maltotriose, or all trisaccharides such as maltotriose and all hexoses such as fructose and glucose, that were present in the starting wort.

A further preferred alcohol-reduced fermented beer product, preferably alcohol-free beer, more preferably an alcohol-free lager beer comprises all glucoses, such as all glucoses and maltotrioses, that were present in the starting wort.

A preferred alcohol-reduced fermented beverage is a beverage wherein the decarboxylated phenolic compound 4-vinyl guaiacol is absent.

The invention further provides an use of a fermentative yeast that is not capable of completely converting sucrose, fructose, glucose, maltose and/or maltotriose into ethanol, for the production of an alcohol-reduced fermented beer product, preferably an alcohol-free beer, more preferably an alcohol-free lager beer. Said fermentative yeast preferably is a yeast of the *Saccharomyces* sensu stricto complex, preferably *S. cerevisiae, S. eubayanus* yeast, and/or a hybrid thereof such as *S. pastorianus* (*S. carlsbergensis*), preferably a *S. cerevisiae, S. eubayanus*, and/or a hybrid thereof such as *S. pastorianus* (*S. carlsbergensis*), that is not producing 4-vinyl guaiacol.

3 FIGURE LEGENDS

FIG. 1: Decarboxylation of ferulic acid to 4-vinylguaiacol (4-VG).

Figure 2:
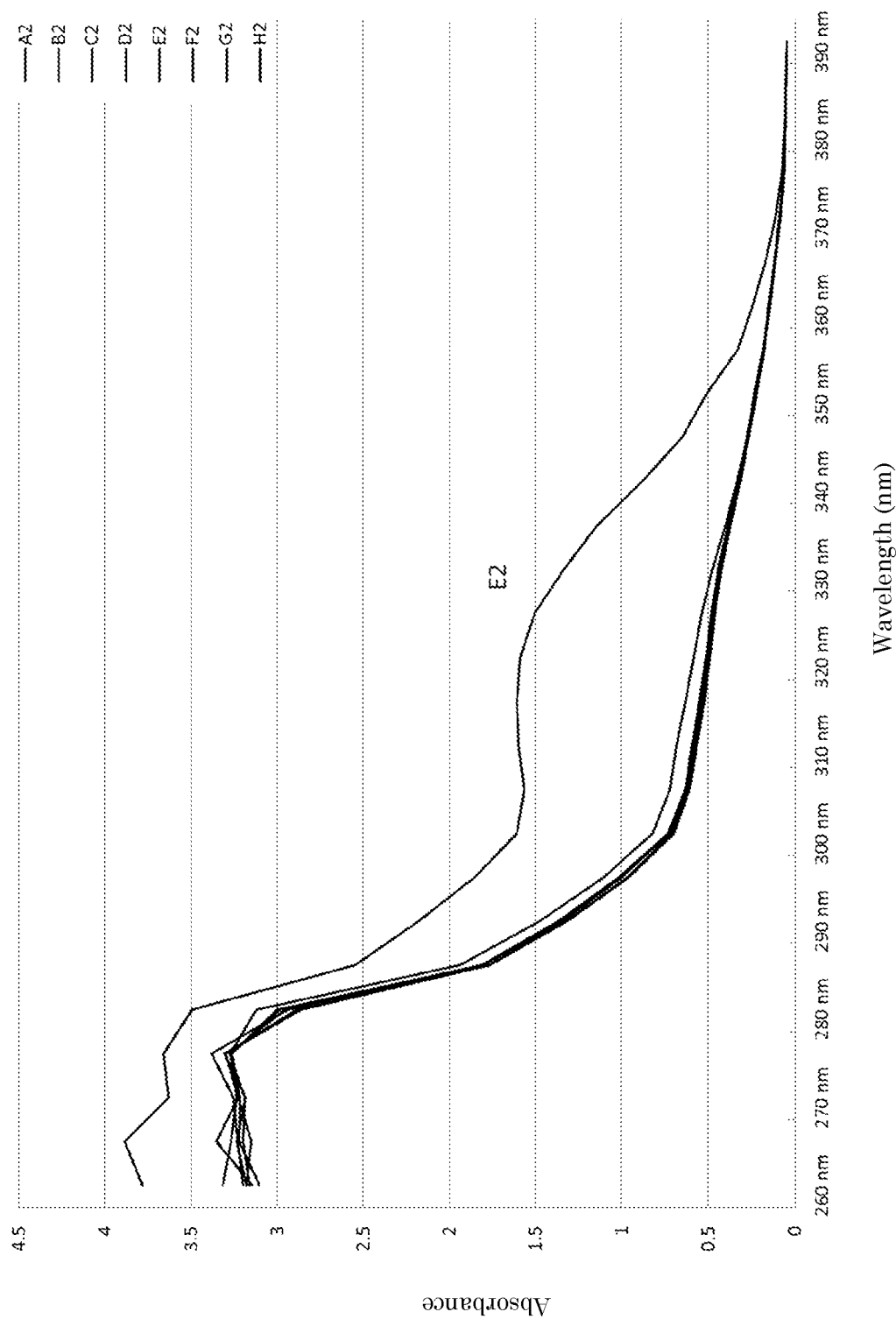

FIG. 2: Absorbance spectrum 250-400 nm determined in 96 well microtiter plates measured in the Tecan Infinite Pro 200. Cells (UV mutagenized variants of *S. eubayanus* CBS12357) were grown in 24 deep well plates in 3 ml synthetic wort containing 1 mM ferulic acid. Conversion of ferulic acid into 4-VG resulted in a strong decrease of the absorption values above 300 nm. Lines represent spectra from 8 different variants. As an example variant E2 shows a spectrum that is indicative for a strongly reduced ferulic acid conversion.

Figure 3:
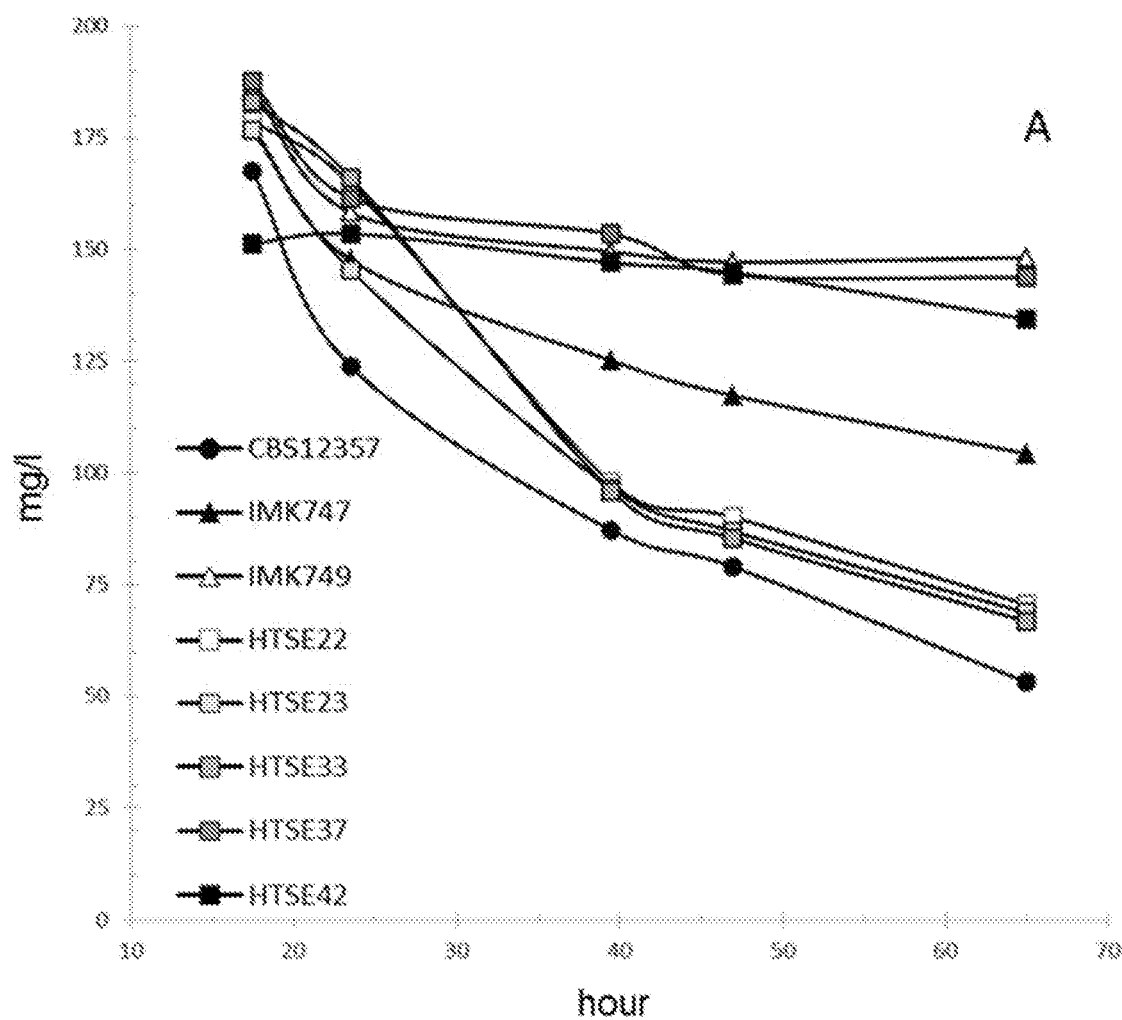
Figure 3:
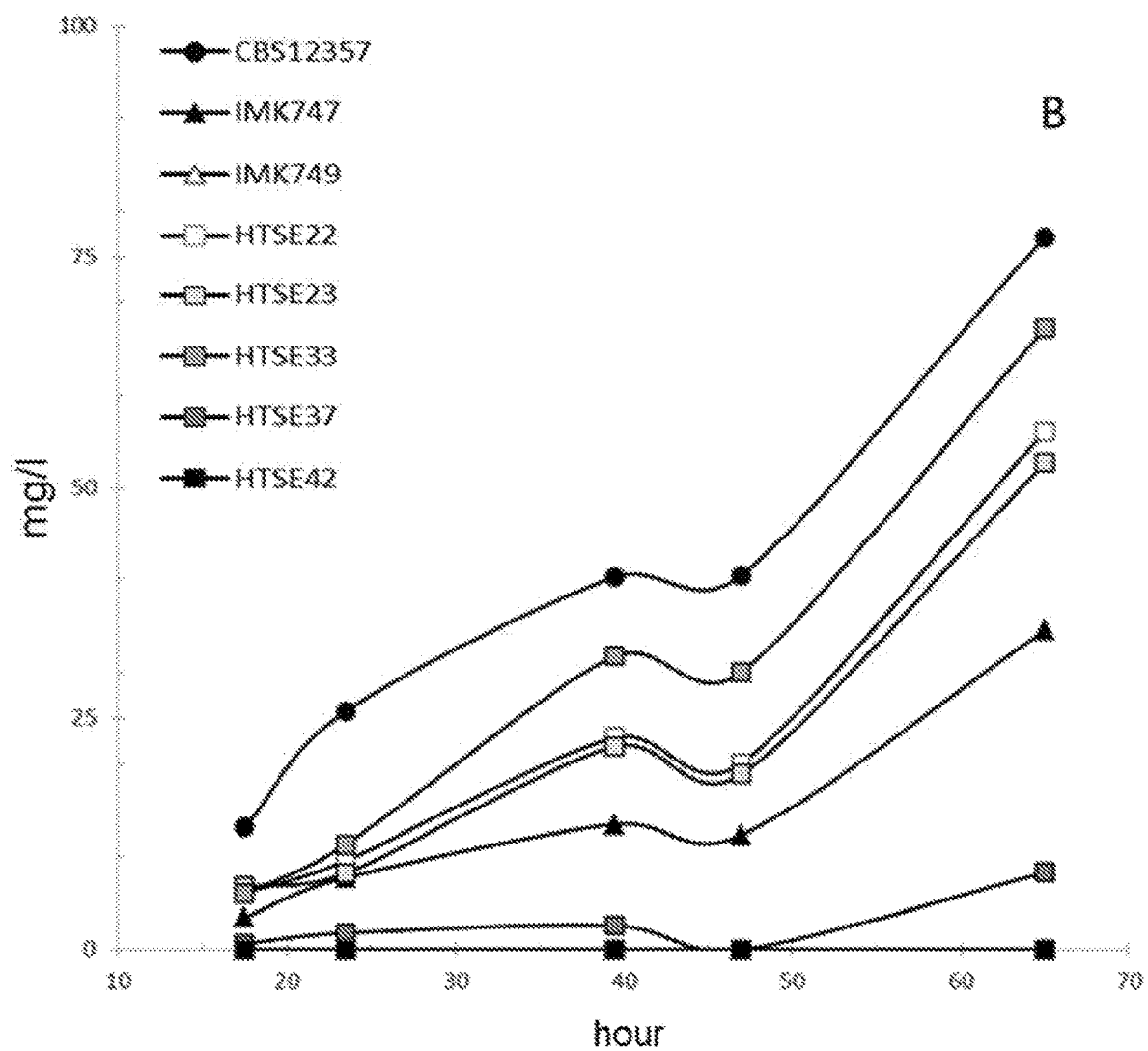

FIG. 3. Conversion of ferulic acid (FIG. 3A) into 4-VG (FIG. 3B). Cells were grown in 24 deep well plates in 3 ml synthetic wort containing 1 mM cinnamic acid. Growth of *S. eubayanus* CBS1257 was compared to the single FDC1-PAD1 knockout, the double FDC1-PAD1 knockout and five selected UV-mutagenized variants of CBS12357, HTSE-22, HTSE-23, HTSE-33, HTSE-37, and HTSE-42. Conversion of ferulic acid (FIG. 3A) into 4-VG (FIG. 3B) was determined by HPLC.

Figure 4:
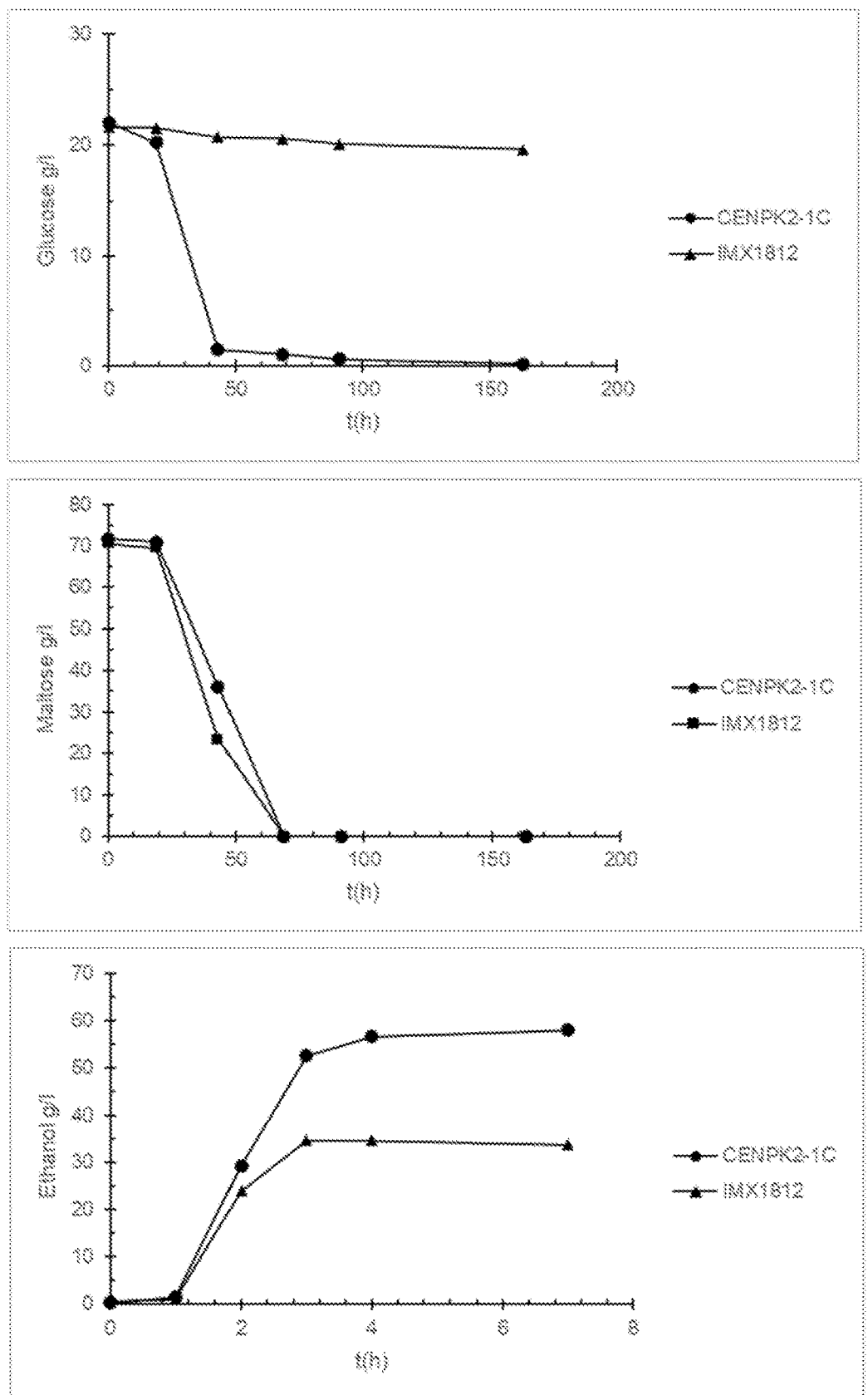
Figure 4:
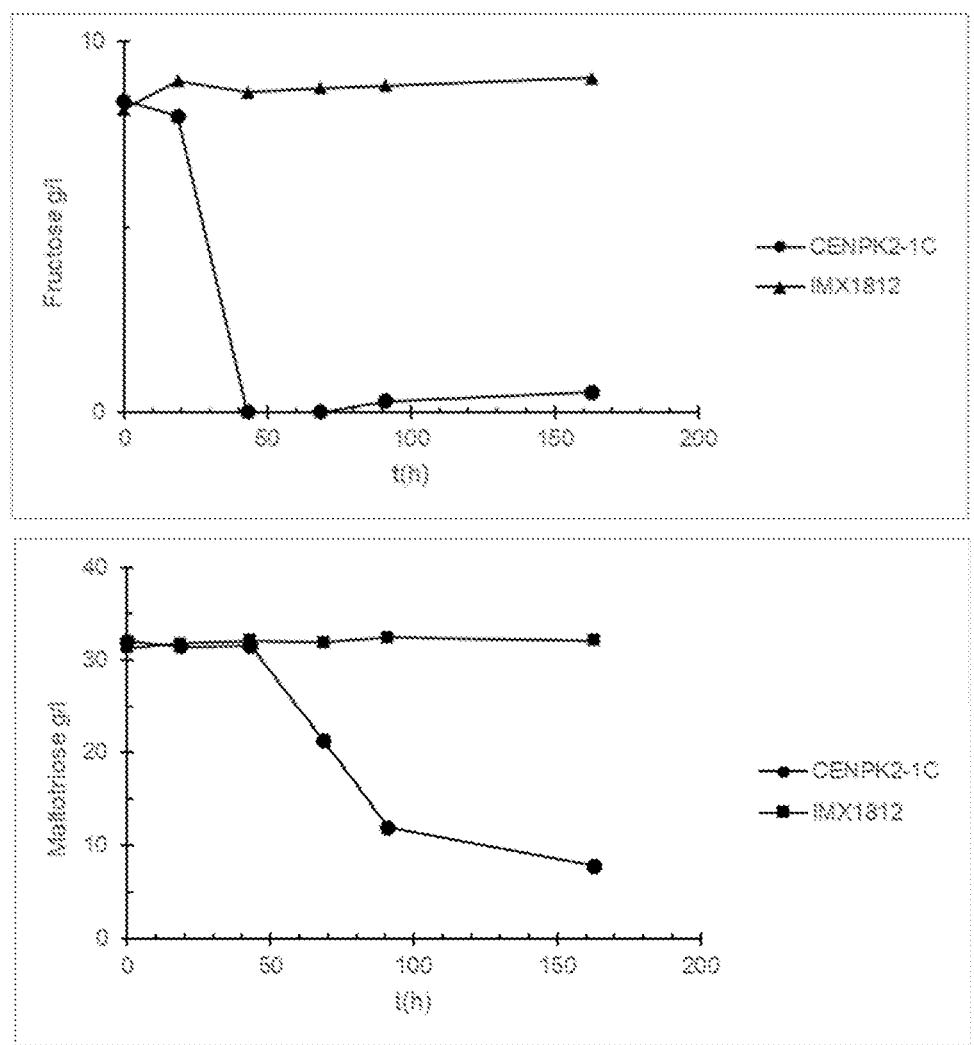

FIG. 4. Sugar and ethanol concentrations during fermentation of 16° P full malt wort. The hexose sugars glucose and fructose are not fermented by the hexose-transport deficient yeast IMX1812.

4 DETAILED DESCRIPTION OF THE INVENTION

4.1 Definitions

The term "fermented beer product", as is used herein, refers to a beer product that is produced by fermentation of, for example, crops and products thereof such as grains, rice, grapes and other fruits, nuts and/or exudations from, e.g. agave, *yucca* and cactus.

The term "alcohol-reduced fermented beer product", as is used herein, refers to a fermented beer having a reduced level of ethanol, when compared to a corresponding normal beverage. For example, an alcohol-reduced beer preferably comprises less than 5 vol %, such as 0.5-1.2% vol % of ethanol as an alcohol.

The term "alcohol-free fermented beer product", as is used herein, refers to a fermented beer product in which no ethanol is present, or in which less than 0.03 vol % is present. It is noted that the maximal percentage for an alcohol-free beer may differ between countries. For example, alcohol-free beer, also termed "non-alcoholic beer", may contain less than 0.5 vol % in the USA and some European countries, but not more than 0.05 vol % in the UK. However, as used herein, the term "alcohol-free fermented beer product" refers to a fermented beer product in which no ethanol is present, or in which less than 0.03 vol % is present.

The term "fermentative yeast", as is used herein, refers to a yeast of the *Saccharomyces* sensu stricto complex, preferably *Saccharomyces cerevisiae, S. eubayanus*, and/or a hybrid thereof such as *S. pastorianus* (*S. carlsbergensis*).

The term "*Saccharomyces* sensu stricto complex", as is used herein, refers to a subfamily that currently comprises nine different species: *Saccharomyces cerevisiae, S. paradoxus, S. cariocanus, S. uvarum, S. mikatae, S. kudriavzevii, S. arboricola, S. eubayanus* and the recently discovered *S. jurei* (Hittinger, 2013. Trends Genet 29: 309-317; Naseeb et al., 2017. Int J Syst Evol Microbiol 67: 2046-2052).

The term "maltotriose", as is used herein, refers to a trisaccharide consisting of three glucose molecules linked with α-1,4 glycosidic bonds.

The term "decarboxylation activity of phenolic acids", as is used herein, refers to the amount of phenolic acids that is converted to its decarboxylated form, preferably the amount of phenolic acids that is enzymatically converted to its decarboxylated form. Enzymatic conversion is preferably catalysed by at least one or both of the two proteins encoded by the genes encoding phenylacrylic acid decarboxylase (PAD1) and/or ferulic acid decarboxylase (FDC1). It has been shown that inactivation of one of these two genes is sufficient to interfere with decarboxylation of phenolic acids. Decarboxylation activity of phenolic acids, i.e. the amount of phenolic acids that is converted to its decarboxylated form can be determined by any method known in the art. For example, ferulic acid and 4-VG display a strong difference of their light absorption spectra between 200 and 400 nm. Ferulic acid shows high absorption values above 300 nm, while conversion into 4-VG results in a decrease of absorption values above 300 nm. This difference may be used to estimate the conversion capacity of ferulic acid into 4-VG, as an estimate for the decarboxylation activity of phenolic acids. For instance, the supernatant of e.g. microtiter plate cultures grown in synthetic wort in the presence of ferulic acid can be collected by centrifugation, e.g. for 5 minutes at 2500×g at 4° C., transferred to a microtiter plate and an absorption spectrum from 250 nm to 400 nm of the 96 well microtiter plate can be determined. As another example, decarboxylation activity can be determined by incubating a yeast cell, or a culture of yeast cells, in the presence of substrate, i.e. a phenolic acid such as ferulic acid or cinnamic acid, and determining the conversion of the phenolic acid to its decarboxylated form by mass spectrometry or high performance liquid chromatography (HPLC).

The term "reduced decarboxylation activity of phenolic acids", as is used herein, refers to the percentage of decarboxylation activity of a yeast. The conversion of phenolic acids can for instance be determined during a predetermined period of time and compared to the conversion of phenolic acids in a control yeast cell or culture of yeast cells during the same period of time. As another example, decarboxylation activity can be determined in a more indirect way by determining the ratio of proliferation of yeast cells cultured in the presence of cinnamic acid and the proliferation of yeast cells cultures in the absence of cinnamic acid. Since cinnamic acid is more toxic to yeast cells than its decarboxylated form styrene, a reduced proliferation of yeast cells in the presence of cinnamic acid of a yeast cell or culture of yeast cells as compared to a reference, means that the decarboxylation activity is reduced. The percentage reduction can for instance be determined by determining the ratio of proliferation of yeast cells cultured in the presence of cinnamic acid. Alternatively, proliferation of yeast cells in the presence or absence of cinnamic acid can be determined and the ratio of proliferation of yeast cells cultured in the presence of cinnamic acid and the proliferation of yeast cells cultures in the absence of cinnamic acid can be determined as a measure of decarboxylation activity. As a reference, a normal yeast strain that is routinely used in fermentation processes, for example a the Heineken—A yeast and/or the Heineken D—yeast for beer fermentation, may be used as a reference for determining a reduced decarboxylation activity of phenolic acids. Said reduction preferably is at least 50%, more preferably at least 60%, more preferably at least 70%, more preferably at least 80%, more preferably at least 90%, more preferably at least 99%, when compared to a normal yeast strain that is routinely used in the indicated fermentation process. This means that a yeast having a reduced decarboxylation activity of phenolic acids has a decarboxylation activity that is at most 40% of the decarboxylation activity of a reference, more preferably at most 30%, more preferably at most 25%, more preferably at most 20%, more preferably at most 15%, more preferably at most 10%, more preferably at most 5%, most preferably at most 1% of the decarboxylation activity of said reference.

The term "mutation", as is used herein, refers to an alteration in the genomic DNA of a yeast, including, but is not limited to, a point mutation, an insertion or deletion of one or more nucleotides, a substitution of one or more nucleotides, a frameshift mutation and single stranded or doubled stranded DNA break, such as a chromosome break or subtelomeric break, and any combination thereof.

The term "gene", as is used herein, refers to any and all cis-acting genomic sequences that ensure that a product encoded by the gene is expressed, including enhancer and promotor sequences, exonic and intronic sequences. Said product is may be an RNA molecule, such as a mRNA molecule, and/or a protein.

The term "a gene involved in transcriptional control" of another gene, as is used herein, refers a gene encoding a transcriptional regulator or factor that regulates expression of that other gene.

The term "inactivated gene", as is used herein, indicates a gene that is not able to perform its normal function. E.g. for a gene encoding a protein "inactivation" means that the gene does not translate into a protein, encodes an inactive protein or encodes a protein with reduced activity. Said inactivation, for example, may be due to an alteration in a promoter sequence such that the promoter is not capable of initiating transcription of the gene, to an alteration of a splicing site of an intron, which alteration interferes with correct splicing of the transcribed pre-mRNA, or an alteration in the coding region of the gene, rendering the encoded protein less active or even inactive. Said inactivation preferably is at least 50%, more preferably at least 60%, more preferably at least 70%, more preferably at least 80%, more preferably at least 90%, more preferably at least 99%, when compared to not inactivated gene.

The term "promoter", as is used herein, refers to a genomic sequence that is considered as a regulatory region of a gene that is required for initiating transcription thereof. It is typically located in the 5' part of the gene.

The term degrees Plato, or ° P, as is used herein, refers to the amount of sugars in 100 grams of wort, prior to fermentation. 10° P equals about 10 gram of sugars. The higher percentage of sugar, the more the yeast can metabolize into alcohol. The amount of sugars can be determined with infrared techniques, including Fourier transform infrared techniques and, for example, by refractometers.

4.2 Methods of Producing an Alcohol-Reduced Fermented Beverage

Yeasts have been used since long in baking, brewing and distilling, such as in bread production and beer and wine fermentation.

Brewer's wort of about 12° P comprises fermentable sugars including maltose (50-60%), maltotriose (15-20%) and glucose (10-15%). The methods of the invention ensure that at least part of the fermentable malt sugars, including disaccharides such as sucrose and/or maltose, hexoses such as fructose and/or glucose, and/or trisaccharides such as maltotriose that are present in the wort is retained in the resulting fermented beer product after reducing the alcohol content of the fermented beer to less than 0.03 vol %. As is indicated herein above, it was found that the drinkability of a resulting alcohol-free beer was considerably improved if the sweet/sour ratio in the resulting product was increased, without a need for the addition of e.g. sweeteners such as unfermented wort or glucose to the resulting product.

Retaining at least part of the sucrose, fructose, glucose, maltose and/or maltotriose that is present in the wort, preferably in the starting wort, may be accomplished by prematurely halting fermentation and removing the yeast from the wort. By a prematurely halt of the fermentation, it is ensured that at least part of the maltose and maltotriose that is present in the wort is retained in the resulting fermented beer product. It is preferred that fermentation is halted at a time that, in addition to at least part of the maltose and maltotriose, also part of the initial hexose, such as glucose and fructose, that is present in the wort is retained in the fermented beer product, preferably an alcohol-free beer, more preferably an alcohol-free lager beer.

The sweetness of a beer may be expressed by the formula:
0.7×[glucose]+1.6×[fructose]+0.5×[maltose]+1×[sucrose]+0.3×[maltotriose], in which formula the sucrose concentration ([sucrose]) is set at 1 (one).

A skilled person is aware that complete fermentation of a beer such as a lager beer may take up to 6 weeks for a $S.$ $eubayanus$ yeast, preferably up to about 2 weeks for other yeasts, depending on e.g. the temperature and the yeast starting culture. Prematurely halting fermentation thus means that fermentation is proceeded for a period less than 6 weeks, preferably for a period of about 7-14 days such as about 8 days, 9 days, 10 days, 11 days, 12 days or 13 days. In case fermentation is performed at higher temperatures, such as above 18° C., said prematurely halting fermentation means that fermentation is proceeded for a period of 3-7 days. such as 4 days, 5 days and 6 days, as will be clear to a person skilled in the art.

The methods of the invention preferably employ a yeast that is not capable of completely converting the fermentable malt sugars such as glucose, fructose maltose and/or maltotriose that are present in wort into ethanol. Said yeast preferably is a naturally occurring yeast of the $Saccharomyces$ sensu stricto complex, preferably $S.$ $cerevisiae,$ $S.$ $eubayanus$ yeast, and/or a hybrid thereof such as $S.$ $pastorianus$ ($S.$ $carlsbergensis$).

$S.$ $eubayanus$ was first isolated from Nothofagus trees and stromata of $Cyttaria$ $harioti$ in North-Western Patagonia (Libkind et al., 2011. Proc Natl Acad Sci 108: 14539-44). Strains of $S.$ $eubayanus$ have subsequently been also isolated from locations in North America (Penis et al., 2014. Mol Ecol 23: 2031-45), Asia (Bing et al., 2014. Curr Biol 24: R380-1) and Oceania (Gayevskiy and Goddard, 2016. Environ Microbiol 18: 1137-47). Initial physiological characterization of the Patagonian $S.$ $eubayanus$ strain CBS12357T revealed that it grows faster than $S.$ $cerevisiae$ at temperatures below 10° C. (Hebly et al., 2015. FEMS Yeast Res 15: fov005), shows poor flocculation (Krogerus et al., 2015. J Ind Microbiol Biotechnol 42: 769-78) and consumes maltose but not maltotriose (Gibson et al., 2013. Yeast 30: 255-266). Gibson et al., 2017. FEMS Yeast Res 17: fox038; Hebly et al., 2015. FEMS Yeast Res 15: fov005)

Said yeast may further comprise one or more naturally occurring mutations, and/or mutations resulting from mutagenesis, in at least one of the genes PAD1 and FDC1, a gene involved in transcriptional control of at least one of said genes, and/or a gene encoding a protein involved in uptake of a phenolic acid, preferably ferulic acid, or involved in export of a decarboxylated phenolic compound, preferably 4-vinyl guaiacol, and/or a gene involved in transcriptional control of said gene.

Said method for producing an alcohol-reduced fermented beer product comprises the provision of mashed cereal grains, preferably barley, in an aqueous solution, preferably in water, to release the malt sugars. This malting step is followed by boiling the resulting wort in the presence of hop, and fermenting the resulting boiled wort after cooling. When fermentation is completed, the beer may be filtered and bottled.

During the fermentation process, fermentable sugars are converted into alcohols such as ethanol, $CO_2$ and flavor compounds such as esters, for example isoamyl acetate. As is known to a person skilled in the art, factors that will influence the appearance and taste of the resulting product include, but are not limited to, roasting temperature and roasting time of the grains, temperature and time of steeping, germination, and kilning of the grains, temperature and time of milling and mashing of the grains, lautering of the resulting mash to generate the wort, temperature and time of boiling of the wort, timing and amounts of added hop, the specific hop that is used, temperature and time of fermentation, type of yeast, mechanically filtering of the or the addition of filtering agents to remove the yeast and finally, carbonating and packaging of the beer. During a conditioning step, which may start after fermentation but before filtering, the yeast is given time, from days to weeks, to absorb common off flavors associated with under-conditioned or "green" beer, including sulfur, butter, and green apples.

In the methods of the invention, the fermentation process is performed at normal temperatures, preferably 2-35° C., 6-25° C., more preferably 7-20, 8-16 or 8-13° C., including. Lager beer fermentation is generally performed at temperatures between 7-13° C. It was surprisingly found that at these temperatures, a yeast that is not capable of completely converting all fermentable malt sugars, such as sucrose, fructose, glucose, maltose and/or maltotriose, especially a $S.$ $cerevisiae$ yeast, a $S.$ $eubayanus$ yeast, and/or a hybrid thereof such as $S.$ $pastorianus$ ($S.$ $carlsbergensis$, resulted in improved organoleptic characteristics of the resulting product after rectification of the produced ethanol.

The sweet/sour ratio in the resulting product may further be increased by reducing the temperature of the fermentation process. It was surprisingly found that a reduced temperature results in a decrease of the amounts of acids that are present in the resulting beer product. A reduction of the amounts of acids results in an increase in the sweet/sour ratio of the resulting product.

To reduce the amount of alcohol in the final beer product, the resulting beer product with an alcohol concentration above 4 vol % is subjected to a physical process involving, for example, rectification and/or dialysis, including reverse osmosis.

Rectification is usually performed under reduced pressure to achieve boiling of the volatile ethanol at a temperature that does not result in breakdown of other ingredients such as proteins and sugars. Said rectification preferably is performed after fermentation at an elevated temperature at 20-50° C. under reduced pressure. Methods for vacuum rectification to reduce alcohol levels have been described, e.g. by Narziss et al., 1993. Brauwelt 133: 1806-1820, and Kern 1994. Alimentacion Equipos y Tecnologia 13: 37-41. Further suitable methods include falling film rectification (Zufall and Wackerbauer, 2000. Monatsschrift fuer Brauwissenschaft 53: 124-137). Suitable large scale rectification systems are available from, for example, KmX Chemical Corporation, New Church, Virginia, Pope Scientific, Inc., Saukville, Wisconsin, M&L Engineering GmbH, Hofheim am Taunus, Germany, Centec, Maintal, Germany, and API Schmidt Bretten GmbH & Co. KG, Bretten, Germany.

Dialysis to reduce alcohol content of a fermented beverage includes passaging of the beverage through a semipermeable membrane (German Pat. Nos. 2 145 298 and 2 413 236). A preferred dialysis process is a single reverse osmosis process to separate a beverage into a concentrate and a filtrate (Belgian Pat. No. 717 847, German Pat. No. 2 323 094, German Pat. No. 2 339 206). Further variants comprise comprising reverse osmosis (U.S. Pat. No. 4,317, 217) and pervaporation (European Patent Application 332, 738). The threshold features of the membrane used determines which low molecular weight molecules, such as the salts, esters and aldehydes, are removed together with the alcohol from the fermented beverage. In addition, the high pressure that is exerted during the process may cause denaturation of molecules, resulting in alterations in physical-chemical properties, such as increased turbidity, flocculation, etc., and in organoleptic properties such as modified flavor and taste. Suitable large scale dialysis systems are available from, for example, Alfa Laval, Lund, Sweden and Osmonics Inc., Minnetonka, Minnesota

4.3 Methods of Mutating a Fermentative Yeast

Mutagenesis can be performed using any method known in the art, including conventional random mutagenesis methods, such as radiation and chemical treatment, and recombinant DNA technologies, such as site-directed mutagenesis or targeted mutagenesis. Hence, in one embodiment, the yeast cell may have been subjected to random mutagenesis, including treatment with UV irradiation, X-ray irradiation, gamma-ray irradiation and a mutagenic agent, or to genetic engineering.

"Random mutagenesis" refers to mutagenesis techniques whereby the exact site of mutation is not predictable, and can occur anywhere in the chromosome of the yeast cell(s) or spore (s). In general, these methods involve the use of chemical agents or radiation for inducing at least one mutation. Random mutagenesis can further be achieved using error prone PCR wherein PCR is performed under conditions where the copying accuracy of the DNA polymerase is low, resulting in a relatively high rate of mutations in the PCR product.

"Genetic engineering" is well known in the art and refers to altering the yeast's genome using biotechnological method, thereby introducing an alteration of the genomic DNA of the yeast, preferably at a predefined site and with a predefined alteration, termed site-directed mutagenesis.

Site-directed mutagenesis can be achieved using oligonucleotide-directed mutagenesis to generate site-specific mutations in a genomic DNA sequence of interest. Targeted mutagenesis refers to a mutagenesis method that alters a specific gene in vivo resulting in a change in the genetic structure directed at a specific site, such as by programmable RNA-guided nucleases, such as TALEN, CRISPR-Cas, zinc finger nuclease or meganuclease technology.

In a preferred embodiment, mutagenesis is performed by subjecting a yeast to treatment with radiation, such as UV irradiation, X-ray irradiation, gamma-ray irradiation, or a mutagenic agent, preferably a chemical agent such as NTG (N-methyl-N'-nitro-N-nitrosoguanidine) or EMS (ethylmethanesulfonate). A particularly preferred mutagenesis procedure comprises UV irradiation, e.g. for 10 seconds to 3 minutes, preferably approximately 1-2 minutes. A preferred method includes exposure to UV light (UVC-lamp, 36 W, MSC-Advantage Biological Safety Cabinet, ThermoFisher Scientific, Waltham, MA) for 80 seconds resulting in a 1% survival rate.

A fermentative yeast that is not capable of completely converting glucose, maltose and/or maltotriose into ethanol may have been generated by mutagenesis. For example, said fermentative yeast may have an alteration in one or more transporter genes, including hexose transporters, mainly glucose and fructose transporters, such as members of the HXT transporter family including HXT1-HXT17, GAL2, AGT1, YDL247w and YJR160c (Wieczorke et al., 1999. FEBS Lett 464: 123-128), preferably all 21 transporters; maltose transporters such as members of the maltose-H+ symporters of the MAL family, including MAL1, MAL2, MAL3, MAL4, and MAL6, MAL11 (AGT1), MPH2 and MPH3; and maltotriose transporters including members of the MAL transporter family such as MAL31, MPH2, MPH3, AGT1 and MTY1, preferably at least an alteration in AGT1 and/or MTY1, including one or more alterations in the actual transporter, an upstream γ-glucosidase and/or downstream transcriptional activator. Examples of such transporter genes and regulators thereof are provided by, for example, Wijsman et al., 2019 (Wijsman et al., 2019. FEMS Yeast Res 19: 10.1093).

Similarly, alteration of a cell surface glucose sensor Rgt2 and/or Snf3 in yeast, and or of the downstream nuclear transcription factor Rgt1, can be employed to repress genes encoding glucose transporters (Roy et al., 2016. Mol Biol Cell 27: 862-871). A person skilled in the art will understand that alteration, preferably by random mutagenesis, of one or more genes encoding key enzymes in uptake, fermentation and/or aerobic degradation of one or more of glucose, maltose and maltotriose, will result in a fermentative yeast that is not capable of completely converting glucose, maltose and/or maltotriose into ethanol. Relevant genes are known, as are methods for randomly mutagenizing these genes.

As is known to a person skilled in the art, sucrose is a disaccharide that may be converted into glucose and fructose by extracellular invertase activity of a yeast. Hence, inhibition of such extracellular invertase may also result in a yeast that is capable of at least partially fermenting said wort, thereby retaining at least part of the sugars that are present in the wort.

Further genes that are preferably altered, preferably by random mutagenesis, are genes involved in decarboxylation activity of phenolic acids, preferably in producing 4-vinyl guaiacol, more preferably in decarboxylating ferulic acid into 4-vinyl guaiacol. Fermented beverages wherein phenolic compounds are generally considered as off flavors include beer, more preferably a beer selected from the group consisting of lager, wild lager, pilsner, pale ale and saison.

In beers, some of the phenolic (off-)flavors originate directly from the wort, others are a result of the enzymatic conversion by yeast, or through chemical conversion as a consequence of oxygen and temperature (e.g. during wort boiling or ageing in the bottle). During beer fermentation, ferulic acid that is present in the wort is converted through enzymatic decarboxylation into the phenolic off-flavor 4-VG (FIG. 1). Initially only Pad1, encoding a phenylacrylic acid decarboxylase, was thought to be involved, but results from Mukai et al. (Mukai et al., 2010. J Bioscie Bioeng 109: 564-569) suggest that both Pad1 and Fdc1, encoding a ferulic acid decarboxylase, are necessary for decarboxylation. Top fermenting yeasts generally contain an active set of Pad1 and Fdc1, while bottom fermenting yeasts are not able to convert the phenolic acids into the corresponding phenolic off-flavors.

A preferred fermentative yeast comprises a mutation in at least one of the genes PAD1 and FDC1 and/or a gene involved in transcriptional control of at least one of said genes, and/or a gene encoding a protein involved in uptake of a phenolic acid, preferably ferulic acid, or involved in export of a decarboxylated phenolic compound, preferably 4-vinyl guaiacol, and/or a gene involved in transcriptional control of said gene.

Said phenolic acid preferably is a phenolic acid that can be converted by a protein encoded by PAD1 and/or a protein encoded by FDC1, more preferably selected from ferulic acid, 4 hydroxy benzoate, sinapic acid, caffeic acid, cinnamic acid, 3,4-dihydroxybenzoic acid, ferulic acid, gallic acid, p-coumaric acid, 4-methoxycinnamic acid, p-hydroxybenzoic acid, 4-hydroxybenzaldehyde, protocatechuic acid, salicylic acid, syringic acid, tannic acid and/or vanillic acid. A particularly preferred substrate is ferulic acid, the uptake of which preferably is reduced or even inhibited in a preferred fermentative yeast that is used in the methods of the invention.

Examples of proteins involved in the export of a product of a protein encoded by PAD1 and/or a protein encoded by FDC1 is Pdr16/YNL231C, Pdr8/YLR266C, Pdr12/YPL058C, Pdr10/YOR328W, Pdr5/YOR153W, Pdr18/YNR070W, Pdr3/YBLOO5W, Pdr15/YDR406W, Pdr17/YNL264C and Pdr11/YIL013C. Said product is preferably a decarboxylated phenolic compound, more preferably 4-VG, 4-vinylphenol, 4 ethyl phenol, guaiacol and eugenol. A particularly preferred product is 4-VG.

5 EXAMPLES

Example 1

Construction of FDC1 and PAD1 Deletion Mutants

To verify the implication of Pad1 and Fdc1 in the formation of 4-vinylguiacol (4-VG), a deletion was introduced in the S. eubayanus strain CBS12357. Since the genes encoding these two enzymes are contiguous, a deletion of both genes could be performed in a single transformation round. The PAD1-FDC1 deletion cassette was constructed by amplifying the amdSYM-cassette from the vector pUG-amdSYM (Solis-Escalante et al., 2013. FEMS Yeast Res 13: 126-139) using the primers with added homology to the upstream and downstream regions of the PAD1-FDC1 locus

```
AmdSYM_FDC1_fw
(5'-CAATATTCGACACACCTATGCTGTAAAGTTTATAAAATATGTAAGT

CATTAATTTGAGAACAAATACGCTGAACGAACCTTTTCAAAGAACTGTTA

ACAACAGCTGAAGCTTCGTACGC)
and amdSYM_PAD1_rv
(5'-GAATTGTTGACACATGGAATTCCAAATAAGTAGATACATATGACTA

CTAGCTTTATTCTCCATTGCCCGATAAACCTAGCAGAGCTCAATTGGTGA

ATGCATAGGCCACTAGTGGATCTG).
```

PCR amplification was performed using Phusion® Hot Start II High Fidelity Polymerase (Thermo Scientific, Waltham, MA) according to the manufacturer's instructions using HPLC purified, custom synthesized oligonucleotide primers (Sigma Aldrich, Zwijndrecht, The Netherlands) in a Biometra TGradient Thermocycler (Biometra, Gottingen, Germany). The deletion cassette was subsequently isolated from a 1% agarose gel using Zymoclean Gel DNA recovery Kit (Zymo Research Corporation, Irvine, CA). Exponentially growing CBS12357 was transformed with the amdSYM-cassette according to the protocol of Gietz and colleagues (Gietz and Schiestl, 2007. Nature Prot 2: 31-34). After transformation, cells were plated on synthetic medium plates with acetamide as sole nitrogen source (Solis-Escalante et al., 2013. FEMS Yeast Res 13: 126-139). Transformed colonies were confirmed to have the amdSYM-cassette in place of PAD1/FDC1 by colony DNA isolation (Looke et al., 2011. Biotechniques 50: 325-328), followed by PCR using DreamTaq PCR Master Mix (2×) (Thermo Fisher Scientific) with primers kanA (5'-CGCACGTCAA-GACTGTCAAG), fw_rep air_FDC LDS (5'-GCGGCT-GAACATATCTCCTG) and rv_checking_oligo_for_FDC1 (5'-CGGCGAAATGCATGGATACG), binding inside the amdSYM marker and outside of the FDC1-PAD1 locus. After three times re-streaking of single colony isolates, the strain was stocked as IMK747 (MATa/MATα Sepad1-Sefdc1Δ::amdS/SePAD1-SeFDC1).

The construction of an homozygote diploid carrying the pad1-fdc1Δ::amdS/pad1-fdc1Δ::amdS mutation was performed through sporulation and tetrad dissection of IMK747. The biomass of an end-exponential culture of the strain IMK747 was collected by centrifugation (5 min., 3000×g) and washed twice with demineralized water. Subsequently the washed biomass was incubated in 20 ml sporulation medium (2% potassium acetate, pH7) for 72 hours at 20° C. in an orbital incubator (Infors Multitron, Infors 509 HT, Bottmingen, Switzerland) at 200 rpm. The presence of asci was checked by microscopic observation. The ascus walls were digested with zymolyase (Zymo research, Irvine, CA) (5 U/ml Zymolyase in 1M sorbitol) for 20 min. at 20° C. The four spores of one tetrad were separated using a micromanipulator (Singer Instruments, Watchet, UK) and grown on Synthetic Medium plates with acetamide as sole nitrogen source. Colonies that showed growth were confirmed to have no copy of FDC1/PAD1 left by colony PCR as described above. After three times re-streaking, a colony was stocked as strain IMK749 (MATa/MATα Sepad1Se-fdc1Δ::amdS/Sepad1-Sefdc1Δ::amdS). As its parent S. eubayanus CBS12357, the strain IMK749 is heterothallic and has the characteristic to switch mating type and thus form stable homozygote diploid cells. IMK749 was confirmed to be a diploid strain by letting it sporulate as described above.

Generation of S. eubayanus Variants by Exposure to UV Light

To construct an S. eubayanus with a reduced ability to convert ferulic acid into 4-VG, S. eubayanus were exposed to UV light to induce mutagenesis. The degree of mutagenesis was controlled by varying the time and strength of the exposure to UV-light. Ideally the UV light will result in a sizeable population of cells with single mutations. Here, we describe the isolation and screening of variants of S. eubayanus CBS12357 cells that were exposed to UV light that resulted in a 1% survival rate.

The diploid S. eubayanus strain CBS12357 (Libkind et al., 2011. PNAS 108: 14539-14544) was grown in YPD (10 g/l Bacto yeast extract, 20 g/l Bacto peptone, 20 g/l glucose) until early stationary phase. After that, cells were harvested by centrifugation (1000×g at 4° C. for 5 min.) and washed with demineralised $H_2O$. Then, cells were incubated for 72 h at 20° C. in sporulation medium (2 (w/v) potassium acetate, pH 7). Presence of asci spores was checked by microscopy. Exposure of sporulated *S. eubayanus* CBS12357 cells to UV irradiation (UVC-lamp, 36 W, MSC-Advantage Biological Safety Cabinet, Thermo Fisher Scientific)) for 80 seconds resulted in a 1% survival rate. Mutagenized cells were plated at an average of 200 colonies per plate. Cells were incubated in the dark at room temperature for 5 days. A total of 2000 single colonies were colony-picked using a Tecan Freedom Evo 2000 (Tecan, Männedorf, Switzerland) equipped with a Pickolo colony picker (Sci Robotics, Kfar Saba, Israel) and arrayed in 96 well microtiter plates filled with 200 µl synthetic wort.

For screening purposes yeast was grown in a synthetic wort resembling 5× diluted wort that contained 14.4 g/l glucose, 2.3 g/l, fructose, 85.9 g/l, maltose, 26.8 g/l maltotriose, 5 g/l $(NH_4)SO_4$, 3 g/l $KH_2PO_4$, 0.5 g/l $MgSO_4 \cdot 7H_2O$, 1 ml/1 trace element solution, 1 ml/1 vitamin solution and supplemented with the anaerobic growth factors ergosterol and Tween 80 (0.01 g/l and 0.42 g/l respectively (as described in Verduyn et al. (Verduyn et al., 1992. Yeast 8: 501-517).

Screening of Strains with Reduced Ability to Produce 4-VG

The pre-culture 96 well microtiter plates were incubated at 20° C. for 48 h in an orbital incubator (Infors Multitron) at 250 rpm. Subsequently, the microtiter plates were replicaplated in three different media by transferring 10 µl of each pre-culture into fresh microtiter plates filled with either 200 µl synthetic wort or synthetic wort containing 1 mM ferulic acid or synthetic wort containing 1 mM cinnamic acid. Stock solutions of 0.5 M ferulic acid and 0.5 M cinnamic acid were made in 100% ethanol. The reference strain *S. eubayanus* CBS12357 was added to each microtiter plate as positive control. One column in the microtiter plate only contained media as control for contamination in between wells. The mutagenized isolates were grown for 3 days at 20° C. in an orbital incubator (Infors Multitron) at 250 rpm. The growth was estimated by measuring the culture optical density at 660 nm with the Tecan Infinite 200. Strains expressing a reduced capacity to convert cinnamic acid into styrene exhibit a higher sensitivity towards cinnamic acid. The growth inhibition was then estimated by measuring the ratio of the $OD_{660nm}$ after 3 days measured in the presence of cinnamic acid over the $OD_{660nm}$ after 3 days measured in the absence of cinnamic acid. The parental strain CBS12357 showed variation in the ratio of the $OD_{660nm}$ after 3 days with and without cinnamic acid between 50 and 75%. Approximately 10% of the isolated mutagenized variants showed a ratio (between 5 and 50%) that was lower than the observed variation in parental strain ratios, suggesting strains that are more inhibited by cinnamic acid.

Ferulic acid and 4-VG display a strong difference of their light absorption spectra between 200 and 400 nm. Ferulic acid shows high absorption values above 300 nm, while conversion into 4-VG will result in a decrease of absorption values above 300 nm. This difference may be used to estimate the conversion capacity of ferulic acid into 4-VG in single mutants. The supernatant of the microtiter plate cultures grown in synthetic wort in the presence of ferulic acid was collected by centrifugation for 5 minutes at 2500×g at 4° C. Supernatants were transferred to a microtiter plate with a Tecan Freedom Evo 2000 (Tecan). An absorption spectrum from 250 nm to 400 nm of the 96 well microtiter plate was determined from a 5 times dilution in demineralised water with the Tecan Infinite Pro 200. Conversion of ferulic acid concentration was accompanied by a decrease of absorbance. A low conversion of ferulic acid into 4-VG is accompanied by increased absorption values above 300 nm, indicating cultures that were not active at all, or not active in the conversion of ferulic acid into 4-VG specifically.

*S. eubayanus* CBS12357 variants that showed normal growth on synthetic wort, a higher susceptibility to cinnamic acid as determined by the ratio between growth on synthetic wort and synthetic wort supplemented with cinnamic acid, and a lower conversion of ferulic acid as determined from the absorption spectra after growth on synthetic wort supplemented with ferulic acid, were isolated for further analysis. Early stationary phase cells were supplemented with 30% (v/v) glycerol, divided in 1 ml aliquots and stored at −80° C. until further use.

Characterization of Strains with Reduced Capacity to Produce 4-VG

A screen of 2000 UV-exposed variants of *S. eubayanus* CBS1237 yielded 28 yeast strains with a potentially reduced capacity to convert ferulic acid into 4-VG. In the screening the selected variants showed growth on synthetic wort that was not disturbed, growth on synthetic wort supplemented with cinnamic acid that was 50% or less compared to growth on synthetic wort, and higher absorbance values above 300 nm with synthetic wort supplemented with ferulic acid.

The selected strains were cultivated in deep well plates at 20° C. at 250 rpm in an orbital incubator (Infors Multitron)) in 3 ml synthetic wort, synthetic wort supplemented with 1 mM ferulic acid, and synthetic wort supplemented with 1 mM cinnamic acid. The 28 strains were evaluated for growth, inhibition by cinnamic acid and ferulic acid conversion. As an example variant E2 shows a spectrum that is indicative for a strongly reduced ferulic acid conversion (FIG. 2).

From the 28 selected strains a subset of 5 were studied in more detail and compared to the parental *S. eubayanus* CBS1237 and the control deletion strains IMK747 (MATa/MATα Sepad1-Sefdc1Δ::amdS/SePAD1-SeFDC1) and IMK749 (MATa/MATα Sepad1-Sefdc1Δ::amdS/Sepad1-Sefdc1Δ::amdS). Cells were grown in duplicate in 20 ml cultures in 50 ml Greiner tubes at 20° C. at 200 rpm in an orbital incubator (Infors Multitron)) in synthetic wort containing 1 mM ferulic acid or 1 mM cinnamic acid. Samples were taken at regular time intervals and analyzed for growth, ferulic acid consumption and 4-VG production (FIG. 3).

Ferulic acid, 4-vinylguaiacol and cinnamic acid were measured at 214 nm, using an Agilent Zorbax SB-C18 Column (4.6×5.0, 3.5 micron) operated at 30° C. (Vos et al., 2015. Microbial Cell Fact 14: 133). A gradient of acetonitrile and 20 mM $KH_2PO_4$ (pH 2) with 1% acetonitrile was used as eluent, at a flow rate of 1 ml min$^{-1}$, increasing from 0 to 10% acetonitrile in 6 min followed by an increase to 40% acetonitrile until 23 min. From 23 min to 27 min, 20 mM $KH_2PO_4$ with 1% acetonitrile was used as eluent. Ferulic acid, 4-vinylguaiacol and cinnamic acid standards for calibration were obtained from Sigma Aldrich (Sigma-Aldrich, Zwijndrecht, The Netherlands).

The strains IMK747 (MATa/MATα Sepad1-Sefdc1Δ::amdS/SePAD1-SeFDC1) and IMK749 (MATa/MATα Sepad1-Sefdc1Δ::amdS/Sepad1-Sefdc1Δ::amdS) showed a reduction in final $OD_{660nm}$ of 25% and 75%, respectively after 3 days of growth in synthetic wort that contained cinnamic acid. Three of the selected variants showed inhibition by cinnamic acid comparable to the parental strain CBS12357 (MATa/MATα SePAD1-SeFDC1/SePAD1-SeFDC1) and IMK747 (MATa/MATα Sepad1-Sefdc1Δ::amdS/SePAD1-SeFDC1), while two of the selected variants HTSE-37 and HTSE-42, showed inhibition comparable to IMK749 (MATa/MATα Sepad1-Sefdc1Δ::amdS/Sepad1-Sefdc1Δ::amdS). Three of the selected variants HTSE-22, HTSE-23 and HTSE-33 showed a ferulic acid conversion into 4-VG that was comparable to the parental strain CBS12357 (FIG. 3). The single SeFDC1-SePAD1 knockout IMK747 showed a ferulic acid conversion that was approximately half of the parental strain CBS12357. In two of the selected variants HTSE-37 and HTSE-42 conversion of ferulic acid conversion into 4-VG was strongly reduced or absent comparable to the double FDC1-PAD1 knockout IMK749.

Sequence Analysis of the 4-VG Negative UV Mutant HTSE-42.

Genomic DNA of the strains CBS12357 and HTSE-42 were prepared as previously described (de Kok et al., 2012. FEMS Yeast Res 12: 359-374). Libraries of an average insert size of 413-bp and 323-bp for CBS12357 and HTSE-42 respectively were constructed and paired-end sequenced with a read length of 150-bp.

A total of U.S. Pat. Nos. 21,345,630 and 20,998,964 reads were generated for the strains CBS12357 and HTSE-42, respectively, accounting for more than 3 Gb of data per strain representing a minimum of 125-fold coverage of the diploid genome of S. eubayanus. Sequence reads of each strain were mapped onto S. eubayanus CBS12357 (genome PRJNA243390; Baker et al., 2015. Mol Biol Evol 32: 2818-2831) using the Burrows-Wheeler Alignment tool (BWA) and further processed using SAMtools (Li and Durbin, 2009. Bioinformatics 25: 1754-1760; Li et al., 2009. Bioinformatics 25: 2078-2079; Li and Durbin, 2010. Bioinformatics 26: 589-595).

Single-nucleotide variations and indels were determined using Pilon (Walker et al., 2015. Plos One 9: e112963). The Pilon results file .vcf was visualized using IGV (http://software.broadinstitute.org/softwarehgv/). While 143 variant positions were identified in HTSE-42 sequence, the large majority were identified in regions close to the breaks and were also found in the reference CBS12357. However, a large deletion was observed towards the right telomere of chromosome XIII. A region of ca. 27 kb was deleted in HTSE-42. This region harbored the gene SePAD1 and SeFDC1.

Generation of Hybrids with S. eubayanus Strains with a Reduced Capacity to Produce 4-VG Hybrids with a reduced ability to convert ferulic acid into 4-VG were generated through mass-mating between a haploid vegetative S. cerevisiae and spores of S. eubayanus IMK749 (CBS12357 with a PCR-based disrupted version of PAD1/FDC1). Spores were prepared as described before. Mass mating was done as described by Hebly and colleagues (Hebly et al., 2015. FEMS Yeast Res 15: fov005): 100 µl of a mid-exponential phase cell suspension of S. cerevisiae IMK439 (MATa HIS3 TRP1 LEU2 SUC2 MAL2-8 C ura3Δ::KanMX) was added to the S. eubayanus spores and incubated 4 hours at 30° C. in an orbital incubator (Infors Multitron) at 200 rpm before plating on selective plates. The selective plates were made according to Verduyn et al., 1992. Yeast 8: 501-517, where the ammonium sulphate is replaced by glutamic acid, to prevent impeding G418 that is supplemented as antibiotic. Three single colonies were re-streaked three times before colonies were stocked. The single colony isolates were allowed to stabilize on synthetic wort for approximately 50 generations before they were stocked and evaluated for the ability to convert ferulic acid into 4-VG. The resulting hybrids were named HTSH-012, HTSH-013 and HTSH-014 (MATa/MATα Sepad1-Sefdc1Δ::amdS/Sepad1-fdc1)

In a similar fashion haploid vegetative S. eubayanus and spores of S. eubayanus HTSE-42 (a UV-mutagenized variant of CBS12357 exhibiting reduced 4-VG production) were mass-mated. The resulting hybrids were named HTSH-009, HTSH-011 and HTSH-012 (MATa/MATα Sepad1-Sefdc1Δ/Sepad1-Sefdc1). Successful hybridisation was confirmed by PCR and flow cytometry. Using primers specific for S. cerevisiae (Scer F2: 5'-GCGCTTTACATTCAGATCCCG AG and Scer R2: 5'-TAAGTTGGTTGTCAGCAAGATTG) and S. eubayanus (Seub F3: 5'-GTCCCTGTACCAATT-TAATATTGCGC and Seub R2: 5'-TTTCACATCTCT-TAGTCTTTTCCAGACG), as described (Pengelly and Wheals, 2013. FEMS Yeast Res 13: 156-161), resulted in both an S. cerevisiae specific band and an S. eubayanus specific band for the hybrids. Staining of cells with SYTOX Green Nucleic Acid Stain was performed as described by (Haase and Reed, 2002. Cell Cycle 1: 132-136). Stained cells were analysed on a flow cytometer equipped with a 488 nm laser (BD Accuri C6, BD Biosciences, Sparks, MD). The hybrids were compared with strains of known ploidy (n, CEN.PK113-7D; 2n, 214 CEN.PK122; 3n, FRY153) (van den Broek et al., 2015. Appl Environ Microbiol 81:6253-6267). All hybrids HTSH-009-HTSH014 showed fluorescence intensity peaks similar to the 2N control strain which, in combination with the growth requirement of the strain $Ura^+$ $G418^+$, confirmed the hybrid nature of the strains.

Example 2

Material & Methods:

The base beer was produced with a Saccharomyces eubayanus yeast deficient in 4-vinyl guaiacol (4VG) production, as provided in Example 1. A regular full malt wort was used as a basis, with the exception that no hop was dosed in the brewing process and the pH was not adjusted after wort boiling. The initial sugar concentration of the wort was determined by an Anton Paar Beer Alcolyzer at 15.6° Plato. Yeast was inoculated at $1.0 \times 10^7$ CFU/ml. The fermentation was pitched at 8° C. and allowed a free rise to 13° C. in 10001 wort. After two weeks the fermentation was cooled to −1° C. for 1 day and afterwards the beer was filtered over a BMF filter. The filtered beer was dealcoholized by a Sigmatec® dealcoholisation system (API Schmidt-Bretten GmbH & Co. KG, Bretten, Germany) according to manufacturer conditions to an alcohol content of less than 0.03% alcohol by volume. The resulting beer was standardized with brewing water to a gravity of 5.3 degrees Plato (° P), as determined with a calibrated refractometer or a hydrometer, and bitterness was set to 16 European Bitterness Units (EBU) using hop extract according to standard analyses provided by Analytica-EBC (2004) which are available at the internet address ://analytica-ebc.com). The beer was subsequently bottled and pasteurized. Concentration of fermentable sugars were determined by ultra-performance liquid chromatography (UPLC) (Waters Co).

The sugar content was measured with Ultra Performance Liquid Chromatography (UPLC). UPLC can be suitably conducted at a temperature of 65° C. As eluent, a mixture of acetonitrile/water in a 75/25 (v/v) ratio was used. The detector used was a Refractive Index (RI) detector. The sugar content of a sample was determined by comparing the UPLC curve of the sample with calibration curves of standard samples with known sugar concentrations.

The samples for UPLC were prepared as follows. A sample of beer or wort was diluted by a factor 5 by addition of acetonitrile/water mixture (50/50—equal volume parts). If present, $CO_2$ was removed prior to dilution (e.g. by shaking or stirring the sample). After dilution, the sample was filtrated to obtain a clear solution. The filtered sample was injected into the UPLC at 65° C. using the above-mentioned eluent.

Ester and higher alcohol content was measured by gas chromatography on an Agilent 7820A with the following setup: a Gerstel MPS head-space sampler, a DBWaxETR column (60 m, ID 0.32 mm, FD 1 μm (Agilent)) and a Flame Ionisation Detector.

An internal standard solution was prepared by mixing 70.0 ml ethanol, 0.600 ml 4-heptanon and 6.00 ml 1-butanol with distilled water to a total volume of 1000 ml. The ethanol content of each sample was set in the range of 4.4%-5.6% by either adding ethanol or diluting the sample with distilled water. A volume of 5.0 ml was transferred to a 10 ml GC vial, 40 μl of the internal standard solution was added, and the vial was capped. Results were quantified by comparing to calibration curves of standard samples with known concentrations.

Results:

To produce a 0.0 beer, a brewing process with a yeast that does not consume all fermentable sugars was used, in this case *S. eubayanus*. Furthermore this particular yeast strain did not have the ability to produce 4VG. In this way a beer could be produced with more 'mouthfeel' in comparison to a regular 0.0 beer based on a dealcoholisation process. A regular brewing process was followed with regular process conditions resulting in an alcoholic beer. The alcoholic beer was dealcoholized and the resulting product was standardized to 5.3° P and 16 EBU. In TABLE 1 some characteristics of this new beer are given in comparison to a dealcoholised regular beer. Furthermore the beer was evaluated by taste for mouthfeel. Mouthfeel had increased in comparison to a regular dealcoholized beer.

TABLE 1

Characteristics of the new beer

| Characteristic | Regular 0.0 | New 0.0 |
| --- | --- | --- |
| Original Extract (% m/m) | 4.4 | 5.4 |
| Alcohol (% m/m) | <0.05 | <0.05 |
| Glucose g/100 ml | 0.10 | <0.01 |
| Fructose g/100 ml | 0.05 | 0.05 |
| Sucrose g/100 ml | <0.01 | <0.01 |
| Maltose g/100 ml | 0.23 | 0.28 |
| Maltotriose g/100 ml | 0.22 | 1.51 |

Example 3

Material & Methods:
Yeast Strains

The *Saccharomyces cerevisiae* yeast strains used in this example are listed in Table 2 and were kindly provided by prof. Daran-Lapujade from the Industrial Microbiology section of Delft University (Wijsman et al., 2019. FEMS Yeast Res 19: 10.1093). Working stock cultures were cultivated in YPM medium (10 g·L−1 Bacto yeast extract, 20 g·L−1 Bacto peptone and 20 g·L−1 maltose) until mid-exponential phase, completed with sterile glycerol [final concentration 30% (v/v)] and stored at −80° C. as 1 mL aliquots until next inoculation.

TABLE 2

Yeast strains used in this example

| Strain | Relevant genotype |
| --- | --- |
| CEN.PK2-1C | MATa ura3-52 trp1-1 his3 |
| IMX1812 | MATa ura3-52 trp1-1 leu2-3,112 hisΔ can1Δ::Spcas9-natNT2 gal2Δ hxt4-1-5Δ hxt3-6-7Δ::ars4 hxt8Δ hxt14Δ hxt2Δ hxt9Δ hxt10Δ hxt11Δ hxt12Δ hxt13Δ hxt15Δ hxt16Δ mph2(ydl247w)Δ mph3(yjr160c)Δ mal11Δ stl1Δ |

Media and Growth Conditions

Standard growth conditions in this study were at 20° C. in a Multitron Standard-incubator shaker (INFORS HT, Velp, The Netherlands) set at 200 rpm. Pre-cultures were obtained from −80° C. stocks in 50 mL CELLSTAR® cell reactor tubes with filter screw caps (Greiner Bio-One) containing 20 mL YPM medium. After overnight incubation 0.5 ml of culture was transferred to fresh 20 ml YPM medium in 50 mL CELLSTAR® tubes. After two days, cultures were used to inoculate 60 ml sterilized and filtered wort (16 degrees Plato (° P))) at an OD 660 nm of 0.5 in 100 ml septum flasks. Cultures were sampled daily to analyse sugars, ethanol, apparent extract and OD.

Analytical Methods

Specific gravity was measured with a DMA 35 handheld density meter (Anton Paar, Graz, Austria).

Glucose, fructose, maltose, maltotriose, and ethanol were analysed by high-performance liquid chromatography analysis on an Agilent 1260 HPLC equipped with a Bio-Rad HPX-87H ion-exchange column (Bio-Rad, Hercules, CA, USA) operated at 60° C. with a mobile phase of 5 mM $H_2SO_4$ and at a flow rate of 0.6 mL min-1. Detection was done using an Agilent refractive-index detector and an Agilent 1260 Infinity Diode Array and Multiple Wavelength Detector.

Results:

In order to produce a 0.0 beer lacking any maltose while the hexose sugars glucose and fructose would still be present at the end of the fermentation, a full malt wort was fermented with a hexose-transport deficient *Saccharomyces cerevisiae* yeast strain (IMX1812). Since hexose-transport deficient yeasts have not been reported to ferment maltose in a complex medium as wort, a well described *Saccharomyces cerevisiae* model strain for industrial application was taken as a reference (CEN.PK2-1C; Entian and Kötter, 2007. Yeast genetic strain and plasmid collections. In: Stansfield I, Stark M J R (eds) Yeast Gene Analysis vol. 36, $2^{nd}$ edn. Amsterdam: Academic Press, Elsevier, 629-66). While the reference behaved as a regular brewing yeast with consuming all fermentable sugars, including glucose and fructose, the hexose-transport deficient yeast did not ferment the hexose sugars, while maltose and sucrose were completely fermented (FIG. 4). The resulting fermented base has the composition as shown in Table 3. In comparison to a regular process the fermented base is high in maltotriose and hexose sugars and has therefore a high sweet/sour ratio and improved mouthfeel, especially after rectification to reduce or remove the alcohol. A further advantage of the resulting fermented base is that the alcohol content is less, meaning that less effort is required for rectification to reduce or remove the alcohol.

TABLE 3

Characteristics of the fermented wort with a process using a hexose-transport deficient yeast vs a regular process before dealcoholisation.

| Characteristic | Regular process | New process |
| --- | --- | --- |
| Original Extract °P | 16 | 16 |
| Alcohol g/l | 58 | 34 |
| Glucose g/l | <0.1 | 20 |
| Fructose g/l | <0.5 | 9 |
| Sucrose g/l | <0.1 | <0.1 |

TABLE 3-continued

Characteristics of the fermented wort with a process using a hexose-transport deficient yeast vs a regular process before dealcoholisation.

| Characteristic | Regular process | New process |
| --- | --- | --- |
| Maltose g/l | <0.1 | <0.1 |
| Maltotriose g/l | <10 | 30 |

REFERENCE TO A "SEQUENCE LISTING," A TABLE, OR A COMPUTER PROGRAM LISTING APPENDIX SUBMITTED AS AN ASCII TEXT FILE

The material in the ASCII text file, named "P120270US00_seqlist.ST25.txt", created Aug. 23, 2022, file size of 2,195 bytes, is hereby incorporated by reference.

The invention claimed is:

1. A method of producing an alcohol-reduced fermented beer product, comprising:
providing a wort comprising maltotriose, sucrose and maltose;
adding a fermentative yeast into the wort, wherein the fermentative yeast comprises a hexose-transport deficient *Saccharomyces cerevisiae* yeast strain, whereby the fermentative yeast is not capable of converting maltotriose into ethanol;
at least partially fermenting said wort to obtain a fermented beer, thereby retaining the maltotriose that was present in the wort, and comprising less than 0.1 g/l of sucrose and 0.1 g/l of maltose,
optionally removing the yeast from the wort, and
reducing alcohol content of the fermented beer, thereby producing an alcohol-reduced fermented beer product.

2. The method of claim 1, wherein the fermentative yeast has a reduced decarboxylation activity of phenolic acids.

3. The method of claim 1, wherein the fermentative yeast further comprises a mutation resulting in inactivation of at least one of the genes PAD1 and FDC1, and/or inactivation of a gene encoding a protein involved in uptake of a phenolic acid, or involved in export of a decarboxylated phenolic compound.

4. The method of claim 1, wherein fermentation is performed at 6-25° C.

5. The method of claim 1, wherein alcohol content of the fermented beer product is reduced by rectification.

6. The method of claim 1, wherein the alcohol-reduced fermented beer product is an alcohol-free beer.

7. An alcohol-reduced fermented beer product that is produced by the method of claim 1.

8. The alcohol-reduced fermented beer product of claim 7, which is an alcohol-free beer.

9. The alcohol-reduced fermented beer product of claim 7, wherein 4-vinyl guaiacol is absent.

10. The method of claim 2, wherein the fermentative yeast is not producing 4-vinyl guaiacol.

11. The method of claim 3, wherein the phenolic acid is ferulic acid.

12. The method of claim 3, wherein the decarboxylated phenolic compound is 4-vinyl guaiacol.

13. The method of claim 1, wherein fermentation is performed at 8-15° C.

14. The method of claim 1, wherein alcohol content of the alcohol-reduced fermented beer product is between 0.5-1.2 vol % ethanol.

15. An alcohol-reduced fermented beer product that is produced by fermenting a starting wort comprising maltotriose, sucrose and maltose and a hexose-transport deficient *Saccharomyces cerevisiae* yeast strain, wherein the maltotriose that was present in the starting wort is not fermented, wherein the sucrose and maltose that was present in the starting wort is fermented, and wherein the alcohol-reduced fermented beer comprises less than 0.1 g/l of sucrose and 0.1 g/l of maltose.

16. The alcohol-reduced fermented beer product of claim 15 being an alcohol-free beer.

17. The alcohol-reduced fermented beer product of claim 15 being an alcohol-free lager beer.

* * * * *

SEQUENCE LISTING

```
<160> NUMBER OF SEQ ID NOS: 9

<210> SEQ ID NO 1
<211> LENGTH: 119
<212> TYPE: DNA
<213> ORGANISM: Artificial Sequence
<220> FEATURE:
<223> OTHER INFORMATION: AmdSYM_FDC1_fw primer

<400> SEQUENCE: 1
caatattcga cacacctatg ctgtaaagtt tataaaatat gtaagtcatt aatttgagaa     60
caaatacgct gaacgaacct tttcaaagaa ctgttaacaa cagctgaagc ttcgtacgc    119

<210> SEQ ID NO 2
<211> LENGTH: 120
<212> TYPE: DNA
<213> ORGANISM: Artificial Sequence
<220> FEATURE:
<223> OTHER INFORMATION: amdSYM_PAD1_rv primer

<400> SEQUENCE: 2
gaattgttga cacatggaat tccaaataag tagatacata tgactactag ctttattctc     60
cattgcccga taaacctagc agagctcaat tggtgaatgc ataggccact agtggatctg    120

<210> SEQ ID NO 3
<211> LENGTH: 20
<212> TYPE: DNA
<213> ORGANISM: Artificial Sequence
<220> FEATURE:
<223> OTHER INFORMATION: kanA primer

<400> SEQUENCE: 3
cgcacgtcaa gactgtcaag     20

<210> SEQ ID NO 4
<211> LENGTH: 20
<212> TYPE: DNA
<213> ORGANISM: Artificial Sequence
<220> FEATURE:
<223> OTHER INFORMATION: fw_repair_FDC1_DS primer

<400> SEQUENCE: 4
gcggctgaac atatctcctg     20

<210> SEQ ID NO 5
<211> LENGTH: 20
```

```
<212> TYPE: DNA
<213> ORGANISM: Artificial Sequence
<220> FEATURE:
<223> OTHER INFORMATION: rv_checking_oligo_for_FDC1 primer

<400> SEQUENCE: 5
cggcgaaatg catggatacg                                               20

<210> SEQ ID NO 6
<211> LENGTH: 23
<212> TYPE: DNA
<213> ORGANISM: Artificial Sequence
<220> FEATURE:
<223> OTHER INFORMATION: Scer F2 primer

<400> SEQUENCE: 6
gcgctttaca ttcagatccc gag                                           23

<210> SEQ ID NO 7
<211> LENGTH: 23
<212> TYPE: DNA
<213> ORGANISM: Artificial Sequence
<220> FEATURE:
<223> OTHER INFORMATION: Scer R2 primer

<400> SEQUENCE: 7
taagttggtt gtcagcaaga ttg                                           23

<210> SEQ ID NO 8
<211> LENGTH: 26
<212> TYPE: DNA
<213> ORGANISM: Artificial Sequence
<220> FEATURE:
<223> OTHER INFORMATION: Seub F3 primer

<400> SEQUENCE: 8
gtccctgtac caatttaata ttgcgc                                        26

<210> SEQ ID NO 9
<211> LENGTH: 28
<212> TYPE: DNA
<213> ORGANISM: Artificial Sequence
<220> FEATURE:
<223> OTHER INFORMATION: Seub R2 primer

<400> SEQUENCE: 9
tttcacatct cttagtcttt tccagacg                                      28
```